No. 775,887. Patented November 22, 1904.

UNITED STATES PATENT OFFICE.

WALTER F. B. BERGER, OF LITTLE ROCK, ARKANSAS, ASSIGNOR TO THE AMERICAN BAUXITE COMPANY, OF LITTLE ROCK, ARKANSAS.

REFRACTORY BRICK.

SPECIFICATION forming part of Letters Patent No. 775,887, dated November 22, 1904.

Application filed July 2, 1904. Serial No. 215,101. (No specimens.)

*To all whom it may concern:*

Be it known that I, WALTER F. B. BERGER, a citizen of the United States, residing at Little Rock, in the county of Pulaski and State of Arkansas, have invented new and useful Improvements in Refractory Bricks, &c., of which the following is a specification.

My invention relates to the manufacture of highly refractory materials—such as bricks, tiles, or any other fire-resisting article—suitable for the linings of basic furnaces, converters, &c., and for any other purpose where such a highly refractory surface is needed.

To this end my invention consists, preferably, in the manufacture of highly refractory bricks composed of American bauxite as a base, associated with fire-clay as a binder.

In the manufacture of my bricks I take American bauxite ore, ($Al_2O_3 + 3H_2O$,) which exists in nature, and after the same has been calcined I grind or pulverize it and then mix with fire-clay, usually in the proportion of about one ton of fire-clay to about four tons of American bauxite. It is to be understood that sufficient water is added to produce a pasty mass of such consistency as to facilitate its handling. The mass is then molded into the desired form of any suitable size and then burned in a high temperature in any kiln suitable for the purpose.

If desired, the mixture of bauxite and fire-clay may be left in its powdered form to be used in the form of a plaster to cover the inside of furnaces, kilns, retorts, &c., or to cover any surface where a refractory covering may be desired.

It is to be understood that the American bauxite ore which I use is found in nature and contains iron-oxid, silica, and titanium oxid, chemically combined with alumina. When this bauxite is calcined, it is not the oxid of aluminium heretofore used for bricks, but differs somewhat in that it is a chemical compound of oxid of aluminium and ferro silicate of alumina and ferro titinate.

The ore which I ordinarily use contains about sixty per cent. alumina; but I also desire it to be understood that I do not wish to be limited to any particular grade, as that as well as the grade of fire-clay used may vary according to the use to which it is to be put. The proportions of the two materials may also be varied without departing from the spirit of my invention.

What I claim as new, and desire to secure by Letters Patent, is—

1. A refractory material composed of calcined American bauxite and fire-clay.

2. A refractory material composed of a mixture of calcined American bauxite and a smaller proportion of fire-clay as a binder.

3. As a new article of manufacture, a brick composed of calcined American bauxite ore and fire-clay.

4. As a new article of manufacture, a brick containing calcined American bauxite and about twenty per cent. of fire-clay.

In testimony whereof I affix my signature in the presence of two witnesses.

WALTER F. B. BERGER.

Witnesses:
 DURAND WHIPPLE,
 I. I. LOUDEN.